United States Patent Office 2,834,765
Patented May 13, 1958

2,834,765

N-CYANO-N-ALKYLAMINOALKYL ESTERS

Peter L. De Benneville, Philadelphia, Pa., assignor to Rohm & Haas Company, Philadelphia, Pa., a corporation of Delaware No Drawing. Application July 20, 1954
Serial No. 444,629

9 Claims. (Cl. 260—86.1)

This invention concerns N-cyano-N-alkylaminoalkyl acrylates and methacrylates, their polymers, and copolymers formed therefrom with another polymerizable ethylenic compound. The invention also relates to methods of preparing N-cyano-N-alkyl-aminoalkyl acrylates and methacrylates. These compounds may be represented by the structure

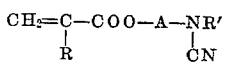

where R is hydrogen or methyl, R′ is an alkyl group, and A is an alkylene group having at least two carbon atoms between oxygen and nitrogen.

One method of preparing these compounds comprises reacting a tert-alkylaminoalkyl acrylate or methacrylate with cyanogen chloride or bromide, CNX, where X is chlorine or bromine, in the presence of an acceptor for hydrogen halide. As acceptor there may be used an alkaline reagent such as sodium hydroxide, potassium hydroxide, calcium hydroxide, sodium carbonate, potassium carbonate, sodium bicarbonate or potassium bicarbonate. The reaction is usually performed between 0° and 75° C., preferably in the presence of a solvent, including water, naphtha, benzene, toluene, xylene, chlorinated hydrocarbon, or the like. The product can be collected as a residue and is often distillable for purposes of purification.

The tert-alkylaminoalkyl acrylates and methacrylates are available through the reaction of tert-alkylaminoalkanols and lower alkyl acrylates or methacrylates in the presence of a transesterification catalyst. While usually the reaction of a secondary amine with an acrylate or methacrylate leads to amides, it has been unexpectedly discovered that when a tert-alkyl group is present on a secondary amino group, esters are formed rather than amides, as shown in the copending application Serial No. 444,645, filed on even date, now United States Patent No. 2,744,884.

As there described, a tert-alkylaminoalkanol is mixed with a lower alkyl acrylate or methacrylate along with a catalyst. The usual catalyst is sodium metal, sodium methoxide, sodium ethoxide, sodium butoxide, potassium ethoxide, potassium butoxide, or other alkali metal or alcoholate thereof, aluminum ethoxide or isopropoxide or lower tetraalkyl titanate, such as tetraisopropyl titanate or tetrabutyl titanate. The reaction mixture is heated between 60° and 160° C. with evolution of lower alkanol and distillation of remaining alkyl acrylate or methacrylate. There is obtained as a residue the desired tert-alkylaminoalkyl acrylate or methacrylate, which may usually be purified by distillation.

In a typical preparation of such an ester, there are mixed 58.5 parts of tert-butylaminoethanol (made by reacting one mole of tert-butylamine with one mole of ethylene oxide in the presence of water and/or an aqueous acid as catalyst), 86 parts of methyl acrylate, 7 parts of di-β-naphthol, and one part of aluminum isopropoxide. The mixture is heated under reflux and vapors are then taken off through a short column with a partial take-off head. A methanol-methyl acrylate azeotrope is taken off at 65°–78° C. followed by a fraction of methyl acrylate. After a forerun of not quite pure product, there is obtained a fraction of essentially pure tert-butylaminoethyl acrylate at 90°–100° C./13 mm.

In a similar way a mixture of 86.5 parts of β-2,4,4-trimethyl-2-pentylaminoethanol, 150 parts of methyl methacrylate, 7 parts of di-β-naphthol, and one part of aluminum isopropoxide is heated and distillate taken off, this being at first methanol and then methyl methacrylate. The product distills at 125°–132° C./9 mm. and corresponds closely in composition to N-tert-octylaminoethyl methacrylate.

In the same way other alkyl esters, such as ethyl acrylate or methacrylate, propyl acrylate or methacrylate or butyl acrylate or methacrylate, may be used. As a tert-alkyl-aminoalkanol there may be used any secondary amine of the formula $R^0NHC_nH_{2n}OH$ where $R^0$ is a tertiary alkyl group of four to twenty-four carbon atoms and $n$ is an integer of two to three. The $R^0$ group may be any of the tertiary forms of butyl, octyl, nonyl, dodecyl, and so on or $R^0$ may represent mixtures of tert-alkyl groups, such as occur in tert-alkylamines which are commercially available. For example, the mixture may comprise dodecyl to pentadecyl groups or $C_{18}$ to $C_{24}$ amines.

As an alternative method for preparing N-cyano-N-alkyl-aminoalkyl acrylates or methacrylates, there may be taken a tertiary aminoalkyl acrylate or methacrylate of the structure

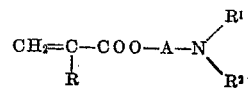

where R is hydrogen or methyl, A is an alkylene group of at least two carbon atoms between oxygen and nitrogen, $R^1$ and $R^2$ are alkyl groups or aralkyl, cycloalkyl, or aryl groups, with the proviso that at least one of these is a lower alkyl or benzyl group. A compound of this formula is reacted by addition between 0° and 75° C. with cyanogen chloride or bromide, apparently to form a quaternary compound, which when heated to 50° to 150° C. decomposes to give the cyanamide

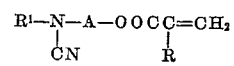

and an alkyl or aralkyl halide, formed from the halogen derived from the cyanogen halide and the smaller or more reactive of the $R^1$ and $R^2$ groups. The advantage of this method is that it permits the use of a variety of N-substituents over a wide range of sizes and permits use of various alkylene groups as A.

Details of typical preparations are shown in the following illustrative examples, wherein parts shown are by weight.

Example 1

To a mixture of 146 parts of N-tert-butylaminoethyl methacrylate, 66 parts of anhydrous potassium carbonate, and 500 parts of water is added with stirring under reflux 51 parts of cyanogen chloride as a gas at 9°–13° C. After one hour at 13°–20° C. and two hours at 30° C., the upper layer is separated, the aqueous layer extracted with benzene, and the total organic layers stripped under water vacuum to remove benzene. After addition of 2 parts of di-β-naphthol, the cyano derivative is distilled to yield 143 parts of colorless liquid boiling at 136°–138° C./2.7 mm. It contains by analysis 13.4% of nitrogen and is N-cyano-N-tert-butylaminoethyl methacrylate, for which the theoretical nitrogen content is 13.3%.

Example 2

In a same manner as described for the methacrylate, from 174 parts of tert-butylaminoethyl acrylate and 70 parts of anhydrous potassium carbonate in 650 parts of water, treated with 61.5 parts of cyanogen chloride dissolved in 200 parts of toluene at 8°–11° C., there is obtained 60 parts of N-cyano-N-tert-butyl-aminoethyl acrylate distilling at 162°–172° C./28 mm. It was found to contain 13.8% of nitrogen and is N-cyano-N-tert-butyl-aminoethyl acrylate.

Example 3

In the same way there were reacted 227 parts of N-tert-octylaminoethyl acrylate and 61.5 parts of cyanogen chloride in toluene in the presence of 70 parts of potassium carbonate in water. The product, N-cyano-N-tert-octyl-aminoethyl acrylate, is obtained as a fraction distilling at 187°–197° C./30 mm.

In the same way there are reacted N-tert-alkylamino-ethyl acrylates or methacrylates having up to 24 carbon atoms in the tert-alkyl portion. In every case a —CN group becomes attached to the amino nitrogen to give the corresponding N-cyano derivative.

The above described alternative method provides a means of preparing N-cyano-N-alkylaminoalkyl acrylates and methacrylates in great variety with some range of N-alkyl groups and also of the alkyl portion attached to oxygen. The N-alkyl group may vary from methyl to octadecyl, for example. The linking alkyl group may have two, three, or more carbons between nitrogen and oxygen. Thus, the starting acrylate or methacrylate may have as the esterifying group such substituents as dimethylaminoethyl, dimethylaminopropyl, dimethylamino-ethyl, diethylaminopropyl, octylmethylaminopropyl, dodecylmethylaminopropyl, octadecylmethylaminopropyl, or dodecylethylaminopropyl. The N-substituents need not be limited to alkyl, however, and cycloalkyl and aralkyl groups may be present, such as cyclohexyl and benzyl. This alternative method is described in more detail in the following illustrative examples.

Example 4

A solution of 47 parts of dimethylaminoethyl methacrylate in 110 parts of benzene is cooled to 4° C., and a solution of 18.5 parts of cyanogen chloride in 42 parts of benzene added at 6°–12° C. over a period of one hour. The mixture is then stirred for one hour at 10°–20° C., and 2.5 hours at 40°–45° C. It is then warmed to 70° C. for one hour and cooled to room temperature. One hundred twenty parts of ether is added and the mixture filtered. The filtrate is stripped under water vacuum. To the residue is added 2 parts of di-β-naphthol. On distillation there is obtained 29.6 parts of clear light-yellow cyanamido-ester, distilling at 126°–132° C/2.9 mm. It is found to contain 16.7% of nitrogen and is N-cyano-N-methylaminoethyl methacrylate.

In place of the above used N,N-dimethylaminoethyl methacrylate there are used 53 parts of N,N-dimethyl-aminopropyl methacrylate. The reaction is carried out in the same way to yield 24 parts of β-(N-cyano-N-methyl-amino)propyl methacrylate distilling at 130°–135° C./3 mm.

In the same way 45 parts of β-(dimethylamino)ethyl acrylate is substituted in the above reaction system. The product is N-cyano-N-methylaminoethyl acrylate, distilling at 123°–129° C./3 mm.

Example 5

There are mixed 50 parts of N-dodecyl-N-methylamino-ethyl methacrylate and 100 parts of toluene. The mixture is cooled below 10° C. and treated with 10 parts of cyanogen chloride in 20 parts of toluene. This mixture is stirred for six hours with the temperature thereof being carried to about 80° C. The reaction mixture is cooled and filtered. The filtrate is evaporated to yield a residue which corresponds in composition to N-cyano-N-dodecylaminoethyl methacrylate.

The N-cyano-N-alkylaminoalkyl acrylates and methacrylates are useful as chemical intermediates. They react with alcohols to give isoureas, which are useful in providing a new kind of polymer, useful as agents for improving the strength of paper. They react with mercaptans to give isothioureas and mercaptothioureas of interest in the field of insecticides. With arylamine salts they give guanidine salts which give useful water-soluble resins.

An important use of the above monomers is to provide valuable polymers and copolymers. For polymerization there are desirably used one or more of the azo free radical catalysts. These contain an —N=N— group attached to aliphatic carbon atoms, at least one of which is tertiary. Typical examples of these polymerization initiators are azodiisobutyronitrile, azobis(α,γ-dimethyl-valeronitrile), azobis(α-methylbutyronitrile), azodiiso-butyramide, dimethyl, diethyl, or dibutyl azodiisobutyrate, or dimethyl, diethyl, or dibutyl azobis(methylvalerate). These and other similar azo compounds serve as initiators for both homopolymerization and copolymerization. An amount of 0.01% to 2% or more is usually sufficient, based on the weight of monomer or monomers.

For preparing many copolymers there may likewise be used the peroxidic free radical catalysts. Typical organic peroxides are benzoyl peroxide, acetyl peroxide, caproyl peroxide, lauroyl peroxide, methyl ethyl ketone peroxide, butyl perbenzoate, tert-butyl hydroperoxide, or cumene hydroperoxide.

For emulsion or suspension polymerization there may be used ammonium persulfate, sodium persulfate, potassium persulfate, or hydrogen peroxide, best in a redox system containing a reducing substance such as sodium sulfite, bisulfite, metabisulfite, or hydrosulfite, with or without a metal as activator.

In a typical polymerization there are placed in a polymerization cell 5 parts of N-cyano-N-tert-butylamino-ethyl methacrylate and 0.05 part of dimethyl azodiiso-butyrate. The cell is blanketed with nitrogen and heated at 70° C. for seven hours. A hard glass-like polymer results. Analysis shows the presence of 13.2% of nitrogen (theory 13.3%).

In the same way 5 parts of N-cyano-N-tert-octylamino-ethyl acrylate and 0.05 part of dimethyl azodiisobutyrate are mixed and heated under nitrogen at 70° C. for 16 hours. A tough polymer results. Likewise, 5 parts of N-cyano-N-tert-alkylaminoethyl methacrylate having N-tert-alkyl groups of 12 to 15 carbon atoms is heated with 0.05 part of dimethyl azodiisobutyrate for 12 hours at 70–75° C. A tough gum is formed. This is useful as a component of coating compositions.

Copolymers of the N-cyano-N-alkylaminoalkyl acrylates or methacrylates with other polymerizable ethylenically unsaturated compounds are prepared according to usual methods. When the above acrylates or methacrylates provide the major proportion, azo initiatiors are of first choice. When they are used in minor proportions, either azo or peroxidic catalyst may be effectively used. Copolymers may be prepared from one or more of the above acrylates or methacrylates and one or more other polymerizable unsaturated compound, such as alkyl acrylate or methacrylate, including methyl acrylate, methyl methacrylate, butyl acrylate, hexyl methacrylate, octyl acrylate, dodecyl methacrylate, acrylamide, N-alkyl acrylamides, methacrylamide, acrylonitrile, methacrylonitrile, dimethyl itaconate, diethyl itaconate, diethyl fumarate, dimethyl maleate, styrene, vinyltoluene, p-chlorostyrene, vinylpyridine, vinylpyrrolidone, vinyl acetate, vinyl propionate, allyl acetate, N-allyl acetamide, methoxyethyl acrylate, dimethylaminoethyl methacrylate, tetrahydrofurfuryl methacrylate, benzyl acrylate, cyclohexyl methacrylate or oleyl acrylate. Polyvinylidene compounds can also be used, these giving cross-linked copolymers, such as allyl acrylate, vinyloxy-ethyl acrylate, vinyloxypropyl methacrylate, ethylene dicrylate, ethylene dimethacrylate, divinylbenzene, or diallyl phthalate.

A mixture is prepared from 9.5 parts of acrylonitrile, 3.4 parts of N-methyl-N-cyanoaminoethyl methacrylate, and 0.1 part of azodiisobutyronitrile in two parts of toluene. This mixture is slowly charged to a reaction vessel equipped with stirrer and heated by an oil bath at 110° C. The vessel is continuously blanketed with nitrogen. Additions of catalyst in toluene are made at 3.1 hours (0.02 part), 4.5 hours (0.009 part), and at 6.1 hours (0.005 part). Heating is continued for 20 hours. Toluene is added to give a 50% solution of copolymer. A 30% solution has a viscosity of 49 cs. at 100° F. The copolymer forms tough hard films.

There are mixed 25 parts of N-cyano-N-tert-butyl-amino-ethyl methacrylate, 75 parts of methyl methacrylate, 0.13 part of azodiisobutyronitrile, and 5 parts of toluene. Under a nitrogen blanket this mixture is slowly added to a polymerization vessel equipped with stirrer and heated with an oil bath at 100° C. During the course of polymerization small amounts of catalyst are added—0.05 part at 3.5 hours, 0.02 part at 4.5 hours and 0.01 part at 6.0 hours. After ten hours of heating enough toluene is added to bring the total weight to 200 parts. The product is a solution of 44% of copolymer. It forms hard films and coatings.

There are mixed 10 parts of N-cyano-N-tert-dodecyl-aminoethyl acrylate, 10 parts of lauryl-myristyl methacrylate (these alkyl groups being those obtained from a fractionated lauryl alcohol), and 0.03 part of dimethyl azodiisobutyrate in two parts of toluene. The mixture is slowly charged to a polymerization vessel maintained under a blanket of nitrogen, equipped with stirrer, and heated with an oil bath held between 110° and 115° C. As above, small additions of catalyst are made in toluene—0.01 part at 3.5 hours, 0.01 part at 4.5 hours, 0.01 part at 5.5 hours, and 0.01 part at 6.5 hours. Heating is continued until 16 hours have elapsed. Toluene is then added to bring the total weight to 40 parts. There is formed a 42% solution of the copolymer. It has a viscosity of 169 cs. at 100° F. The copolymer is a useful additive for lubricating oils, improving the viscosity-index and supplying low temperature dispersing action.

I claim:

1. Compounds of the structure $$CH_2=C-COO-A-NR'$$
$$\phantom{CH_2=}\,|\phantom{-COO-A-N}|$$
$$\phantom{CH_2=}\,R\phantom{-COO-A-}CN$$

wherein R is a member of the class consisting of hydrogen and the methyl group, A is an alkylene group of two to three carbon atoms, and R' is an alkyl group.

2. Compounds of the structure $$CH_2=C-COO-CH_2CH_2NR'$$
$$\phantom{CH_2=}\,|\phantom{-COO-CH_2CH_2N}|$$
$$\phantom{CH_2=}\,CH_3\phantom{-COO-CH_2CH_2}CN$$

where R' is a tertiary alkyl group of four to twenty-four carbon atoms.

3. Compounds of the structure $$CH_2=CH-COO-CH_2CH_2NR'$$
$$\phantom{CH_2=CH-COO-CH_2CH_2N}|$$
$$\phantom{CH_2=CH-COO-CH_2CH_2}CN$$

where R' is a tertiary alkyl group of four to twenty-four carbon atoms.

4. Polymers of a compound of the structure $$CH_2=C-COO-A-NR'$$
$$\phantom{CH_2=}\,|\phantom{-COO-A-N}|$$
$$\phantom{CH_2=}\,R\phantom{-COO-A-}CN$$

wherein R is a member of the class consisting of hydrogen and the methyl group, A is an alkylene group of two to three carbon atoms, and R' is an alkyl group.

5. Polymers of a compound of the structure $$CH_2=C-COO-CH_2CH_2NR'$$
$$\phantom{CH_2=}\,|\phantom{-COO-CH_2CH_2N}|$$
$$\phantom{CH_2=}\,CH_3\phantom{-COO-CH_2CH_2}CN$$

wherein R' is a tertiary alkyl group of four to twenty-four carbon atoms.

6. Polymers of a compound of the structure $$CH_2=CH-COO-CH_2CH_2NR'$$
$$\phantom{CH_2=CH-COO-CH_2CH_2N}|$$
$$\phantom{CH_2=CH-COO-CH_2CH_2}CN$$

wherein R' is a tertiary alkyl group of four to twenty-four carbon atoms.

7. Copolymers of a compound of the structure $$CH_2=C-COO-A-NR'$$
$$\phantom{CH_2=}\,|\phantom{-COO-A-N}|$$
$$\phantom{CH_2=}\,R\phantom{-COO-A-}CN$$

and another polymerizable ethylenically unsaturated compound, R being a member of the class consisting of hydrogen and the methyl group, A being an alkylene group of two to three carbon atoms, and R' being an alkyl group.

8. Copolymers of a compound of the structure $$CH_2=CH-COO-CH_2CH_2NR'$$
$$\phantom{CH_2=CH-COO-CH_2CH_2N}|$$
$$\phantom{CH_2=CH-COO-CH_2CH_2}CN$$

and another polymerizable ethylenically unsaturated compound, R' being a tertiary alkyl group of four to twenty-four carbon atoms.

9. Copolymers of a compound of the structure $$CH_2=C-COO-CH_2CH_2NR'$$
$$\phantom{CH_2=}\,|\phantom{-COO-CH_2CH_2N}|$$
$$\phantom{CH_2=}\,CH_3\phantom{-COO-CH_2CH_2}CN$$

and another polymerizable ethylenically unsaturated compound, R' being a tertiary alkyl group of four to twenty-four carbon atoms.

References Cited in the file of this patent

UNITED STATES PATENTS

| | | |
|---|---|---|
| 2,293,969 | Crawford et al. | Aug. 25, 1942 |
| 2,467,926 | Ardis | Apr. 19, 1949 |
| 2,537,881 | Dickey | Jan. 9, 1951 |
| 2,611,765 | Dickey | Sept. 23, 1952 |